April 13, 1948. A. KALITINSKY 2,439,473
PRESSURIZED PROTECTIVE CONDUIT FOR HOT GAS POWER PLANTS
Filed May 11, 1943 2 Sheets-Sheet 1

INVENTOR
Andrew Kalitinsky
BY Charles A. Warren
ATTORNEY

Patented Apr. 13, 1948

2,439,473

UNITED STATES PATENT OFFICE 2,439,473

PRESSURIZED PROTECTIVE CONDUIT FOR HOT GAS POWER PLANTS

Andrew Kalitinsky, Eagleville, Conn., assignor to United Aircraft Corporation, East Hartford, Conn., a corporation of Delaware Application May 11, 1943, Serial No. 486,614

7 Claims. (Cl. 60—44)

This invention relates to a conduit, particularly useful for hot gases in aircraft power plants.

In a power plant using a gas turbine, if the conduit through which the hot gases under pressure are directed to the turbine should break, the escaping hot gases might cause serious damage before the power plant could be shut down. One object of the invention is to overcome this difficulty by preventing the hot gases from escaping through leaks in the conduit.

The invention is also applicable to the prevention of leakage from a receiver in which gases under pressure may be collected, such as a pressure tank between a source of gases and a gas motor.

In a free-piston engine-and-compressor unit used as a source of hot gases, the engine is scavenged by gases from the compressor, and the engine exhaust gases drive the turbine. The scavenge air is cooler and at a higher pressure than the exhaust gases. A feature of the invention is a shell around the exhaust gas conduit in which scavenge air is maintained under pressure. Should a leak occur in the conduit, the scavenge air, being at a higher pressure, will enter the conduit from the shell and thus prevent the escape of the gases from the conduit.

This invention is particularly advantageous in military aircraft power plants where the conduit between the engine-and-compressor unit and the gas turbine as well as the shell around the conduit may both be pierced during air combat, as by a bullet. If this occurs, the scavenge air entering the conduit from the shell prevents leakage from the conduit even though a part of the air in the shell is escaping into the atmosphere.

In obtaining maximum power output, fuel may be burned in the conduit between the compressor and the turbine, thus raising the temperature of the gases within the conduit. A feature of the invention is a shell surrounding the combustion chamber and filled with scavenge air under pressure to prevent the escape of hot burning gases from the chamber in the event of a leak in the wall of the combustion chamber.

Other objects and advantages will be apparent from the specification and claims, and from the accompanying drawing which illustrates what is now considered to be a preferred embodiment of the invention.

Fig. 3 is a sectional view on line 3—3 of Fig. 1.

Figure 1:
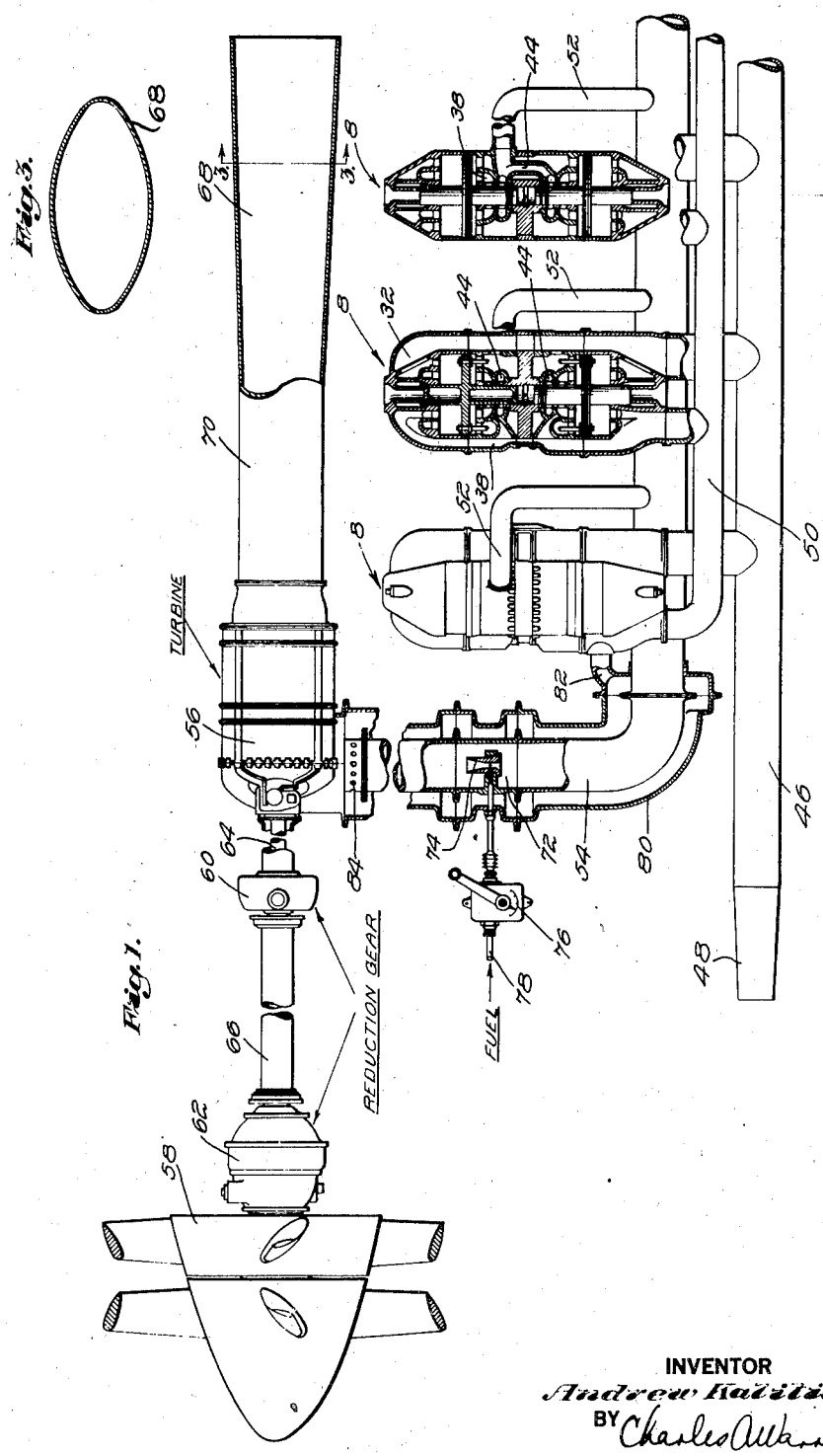
Fig. 1 is a view of the power plant, with two of the free-piston engine-and-compressor units in section.

Each engine-and-compressor unit 8 comprises an engine cylinder 10 having reciprocating pistons 12 and 14 to which compressor pistons 16 and 18 in cylinders 20 and 22 are integrally connected. Sleeves 24 and 26, Fig. 2, attached to the compressor pistons complete the reciprocating piston assemblies. The sleeves in combination with stationary pistons 28 and 30 form air spring cylinders.

Figure 2:
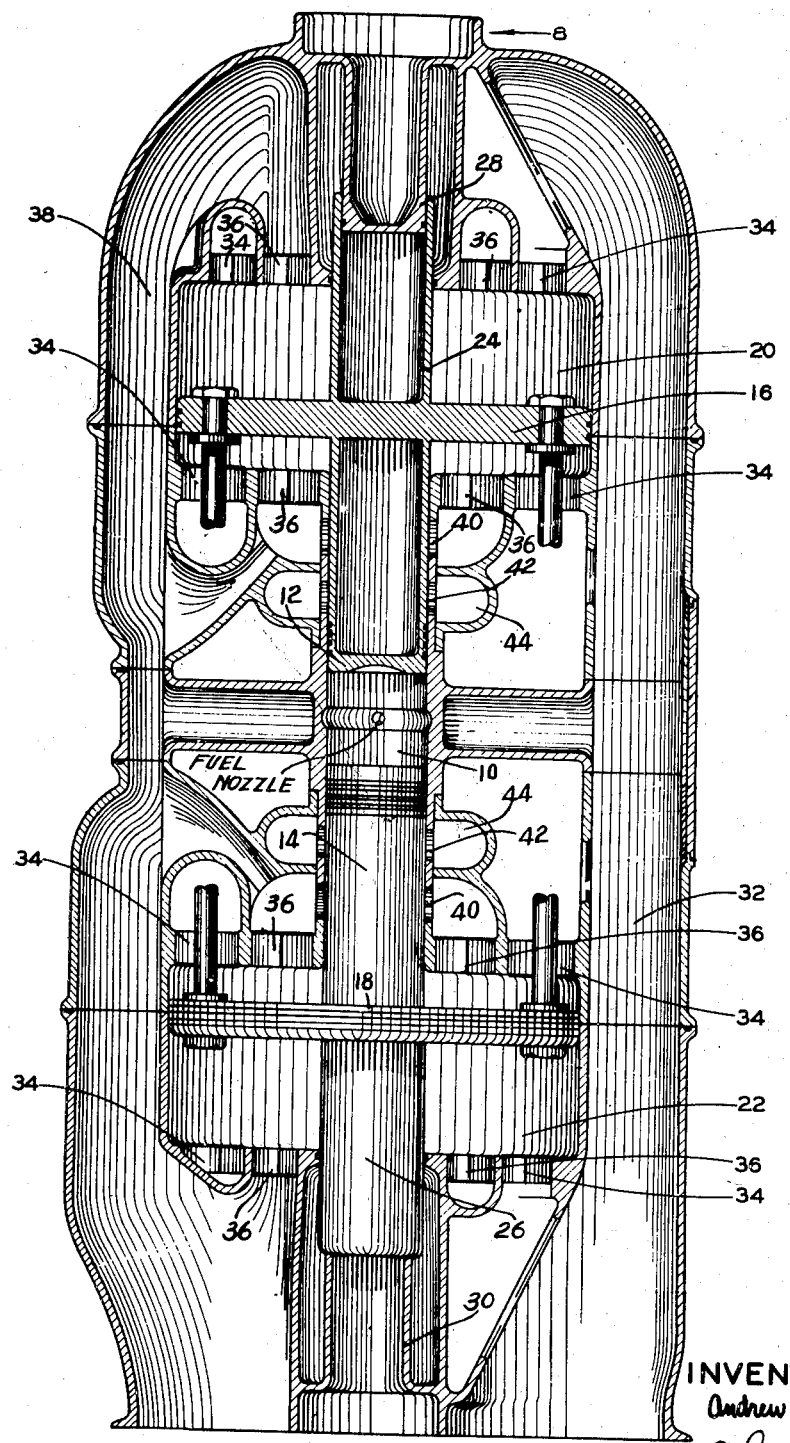
Fig. 2 is a sectional view on a larger scale of the middle engine-and-compressor unit of Fig. 1.

The piston assemblies are moved apart by the burning of fuel injected into engine cylinder 10 by fuel nozzles 31, Fig. 2. Air compressed in the air spring cylinders on the power stroke returns the piston assemblies. The assemblies are always maintained at equal distances from the center of the engine cylinder by a linkage, not shown.

Intake manifold 32 conducts air to sets of intake valves 34 through which air alternately enters opposite ends of the compressor cylinders. The compressed air leaves the cylinders through sets of discharge valves 36, also at opposite ends of the compressor cylinders, and passes through scavenge manifold 38 and through ports 40 which are uncovered by pistons 12 and 14 at the end of the power stroke, thereby permitting air to be blown through the engine cylinder and exhaust ports 42 into exhaust manifold 44. Valves 34 and 36 may be similar to those shown in the patent to Huff 1,599,414, dated September 14, 1926.

As shown in Fig. 1, the intake manifolds 32 of the several units are connected to intake duct 46. The forward-facing open end 48 of this duct is shaped to utilize the dynamic pressure caused by the forward motion of the airplane in order to develop a pressure above atmospheric within the duct. The scavenge manifolds are interconnected by a duct 50.

The exhaust gases, which are the power gases, flow from manifolds 44 through pipe 52 into a duct 54 and thence to the intake of turbine 56. The latter is connected to a propeller system 58 through gear reduction units 60 and 62 and shaft 64 and 66. The turbine exhaust discharges as a jet through a restricted nozzle 68 which is directed rearwardly of the aircraft to produce an additional propulsive thrust.

Nozzle 68 is circular and unrestricted from the turbine as far as 70, and from that point on the cross-section is restricted by flattening the nozzle toward the plane of the paper.

The power gases may be additionally heated, if desired, by inserting a combustion chamber 72 in duct 54. This chamber has a fuel nozzle 74 and a fuel control valve 76 in feed line 78. The chamber is arranged to assure complete burning of the fuel before the power gases reach the turbine intake.

If a leak should occur in the wall of duct 54, the hot gases, being under a pressure greater than atmospheric, would escape from the conduit with the possibility of damaging or setting fire to nearby structures. To avoid this, duct 54 has a surrounding shell 80 spaced from the duct. The shell is connected by pipe 82 to the scavenge manifold 38 of one or more of the compressors so that comparatively cool air at a pressure substantially higher than the gas in the conduit is maintained in the shell. The duct has small ports 84 at the end adjacent the turbine to provide escape of air from the shell into the conduit, thereby providing a flow of air through the shell which keeps the shell cool. Since the pressure surrounding the duct is higher than the pressure within the duct, the wall of the duct can be extremely light since it is not subjected to the pressure differential that would exist if the shell were not provided.

If a break occurs in duct 54, as when both shell 80 and duct 54 have been punctured by a bullet, some of the air in the shell, being at a higher pressure than in the duct, flows into the duct through the break and prevents escape of hot gases outwardly through the break. Since leakage of hot gases is prevented, the turbine will continue to function, and the aircraft in which the power plant is mounted will not be damaged by the escape of flaming or hot gases from the conduit. As a result, the aircraft can continue to fly under its own power, in spite of the break in duct 54.

It is to be understood that the invention is not limited to the specific embodiment herein illustrated and described, but may be used in other ways without departure from its spirit as defined by the following claims.

I claim:

1. A power plant comprising a free-piston engine-and-compressor unit, in which the gas compressed by the compressor part of the unit scavenges the engine, said unit including a scavenge manifold for delivering compressed air from the compressor part directly to the engine, a receiver to which exhaust gas from the engine part of said unit is directed, a duct connecting said unit to said receiver, a shell around said duct to which a part of the compressed gas from the compressor part of the unit is supplied, and a branch connection from said manifold to said shell for conducting gas from the manifold to said shell, said gas being normally at a pressure higher than the pressure of the gas in the duct, thereby maintaining within said shell a volume of gas which surrounds the duct and has a pressure higher than that of the gas in the duct.

2. A power plant comprising a free-piston engine-and-compressor unit in which the gas compressed by the compressor part of the unit passes through the engine cylinder of the unit for scavenging it, said unit including a scavenge manifold for delivering compressed air from the compressor part directly to the engine, a receiver to which exhaust gas from the engine part of said unit is directed, a duct connecting said unit to said receiver and through which the exhaust gas is conducted to the receiver, a shell around said duct to which a part of the gas from the compressor part of the unit is supplied, and a branch connection from said manifold to said shell for conducting gas from the manifold to said shell, said gas being normally at a pressure higher than the pressure of the gas in the duct, thereby maintaining within said shell a volume of gas surrounding the duct and at a pressure higher than the gas in the duct, and at least one small port in said duct for the discharge of the compressed gas from the shell directly into said duct, the path for gas through the shell being parallel to the path for gas through the engine.

3. In a power plant, a source of gas including a free-piston engine-and-compressor unit in which the gas compressed by the compressor part of the unit passes through the engine cylinder for scavenging, said unit including a scavenge manifold for delivering compressed air from the compressor part directly to the engine, a receiver to which exhaust gas from said unit is directed, a duct connecting said unit to said receiver and through which the exhaust gas passes to said receiver, a shell around said duct to which a part of the compressed gas from said compressor part is supplied, and a branch connection from said manifold to said shell for conducting gas from the manifold to said shell, said gas being inherently at a pressure higher than the pressure of the gas in the duct to maintain in said shell a volume of gas surrounding the duct at a pressure higher than the pressure of the gas within the duct, and a throttle exhaust through which gas within the shell discharges directly into said duct.

4. In a power plant, a source of gas including an engine, a compressor driven by the engine, duct means for directing gas from the compressor through the engine for scavenging whereby the pressure of the compressed gas is greater than that of the exhaust gas, a duct for directing the gas exhausting from the engine to a receiver, a shell around said duct, and a branch connection from said duct means to said shell for supplying a part of the compressed gas from the compressor directly to said shell, said gas entering said shell at the inherently higher pressure than the gas within the duct thereby maintaining around said duct and within the shell a volume of gas at a pressure higher than that of the gas within the duct.

5. In a power plant, a source of gas including an engine, a compressor driven by the engine, duct means for directing gas from the compressor through the engine for scavenging whereby the pressure of the compressed gas is greater than that of the exhaust gas, a duct for directing the gas exhausting from the engine to a receiver, a shell around said duct, and a branch connection from said duct means to said shell for supplying a part of the compressed gas from the compressor directly to said shell, said gas entering said shell at the inherently higher pressure than the gas within the duct thereby maintaining around said duct and within the shell a volume of gas at a pressure higher than that of the gas within the duct, and at least one small port in said duct and communicating with the space within the shell for the discharge of compressed gas within the shell directly into said duct.

6. In combination, an engine-and-compressor unit of the type in which gas is compressed at a relatively high pressure by the compressor part of the unit and a part of said compressed gas passes through the engine part of the unit and is exhausted therefrom at a lower pressure, said unit including a duct arrangement for admitting air from said compressor part directly to said engine part, a conduit conducting said exhaust gas to a point of use, a shell surrounding said conduit, a branch passage connecting with said duct arrangement for conducting a part of said high pressure gas to the space between said shell and conduit for maintaining within said shell and surrounding the conduit a volume of gas at a pressure higher than the pressure of the exhaust gas in said conduit, and means within said conduit for supplying fuel to the exhaust gas to be burned in the conduit for adding energy to the exhaust gas, said shell extending at least around the part of the conduit in which the fuel is burned.

7. A power plant comprising a free-piston engine-and-compressor unit in which the gas compressed by the compressor part of the unit scavenges the engine part, said unit including a scavenge manifold for delivering compressed air from the compressor part directly to the engine, a receiver to which exhaust gas from the engine part of the said unit is directed, a duct connecting said unit to said receiver, means for introducing fuel to said duct for burning the fuel within the duct to add heat to the gas before it reaches the receiver, a shell around said duct, a branch passage connecting said manifold to said shell by which a part of the compressed gas from said compressor part of the unit is supplied to said shell, said gas being inherently at a pressure higher than the pressure of the gas in the duct thereby maintaining in said shell and surrounding the duct a volume of gas having a pressure higher than that of the gas within the duct.

ANDREW KALITINSKY.

REFERENCES CITED

The following references are of record in the file of this patent:

UNITED STATES PATENTS

| Number | Name | Date |
| --- | --- | --- |
| 1,281,644 | Ostergren | Oct. 15, 1918 |
| 1,714,893 | Smith | May 28, 1929 |
| 1,714,948 | Coffin | May 28, 1929 |
| 1,827,246 | Lorenzen | Oct. 13, 1931 |
| 2,066,788 | Lysholm | Jan. 5, 1937 |
| 2,078,957 | Lysholm | May 4, 1937 |
| 2,195,025 | Couzinet | Mar. 26, 1940 |
| 2,292,288 | Pateras Pescara | Aug. 4, 1942 |
| 2,331,645 | Altorfer et al. | Oct. 12, 1943 |
| 2,331,685 | Herder | Oct. 12, 1943 |
| 2,353,929 | Ray | July 18, 1944 |

FOREIGN PATENTS

| Number | Country | Date |
| --- | --- | --- |
| 265,517 | Germany | Oct. 9, 1913 |